(12) United States Patent
Ratcliff

(10) Patent No.: US 6,877,620 B2
(45) Date of Patent: Apr. 12, 2005

(54) STACKED COOZIE HOLDER

(76) Inventor: Dexter O. Ratcliff, 1300 Hodge Dr., Morristown, TN (US) 37814

( * ) Notice: Subject to any disclaimer, the term of this patent is extended or adjusted under 35 U.S.C. 154(b) by 0 days.

(21) Appl. No.: 10/390,477

(22) Filed: Mar. 17, 2003

(65) Prior Publication Data
US 2004/0182807 A1 Sep. 23, 2004

(51) Int. Cl.⁷ .................................................. A47F 7/00
(52) U.S. Cl. ...................... 211/113; 211/59.1; 224/545; 224/560
(58) Field of Search ................................ 224/545, 560; 211/113, 117, 118, 59.1, 85.15, 49.1

(56) References Cited

U.S. PATENT DOCUMENTS

| | | | |
|---|---|---|---|
| 750,063 A | * | 1/1904 | Redding |
| 1,464,160 A | * | 8/1923 | Wayel |
| 2,462,431 A | * | 2/1949 | Schneider |
| 2,747,746 A | * | 5/1956 | Laughton .................... 211/113 |
| 3,118,538 A | * | 1/1964 | Flashman |
| 3,224,596 A | * | 12/1965 | Becker |
| 4,763,855 A | | 8/1988 | DiVincenzo |
| 4,957,254 A | | 9/1990 | Hill et al. |
| D367,388 S | * | 2/1996 | Essman |
| 5,676,258 A | | 10/1997 | Leyden et al. |
| 5,727,699 A | | 3/1998 | Gilcrease |
| 5,996,819 A | | 12/1999 | Klein |
| 6,089,386 A | * | 7/2000 | Shiau et al. ............. 211/85.15 |

* cited by examiner

Primary Examiner—Robert W. Gibson, Jr.
(74) Attorney, Agent, or Firm—Pitts & Brittian, P.C.

(57) ABSTRACT

A holder for a plurality of coozies which can be mounted on a hanger such as a clothes hanger in an automobile, sport utility vehicle, or the like, is provided. Each of the coozies has an insulated and compressible side wall in the preferred embodiment. A bottom closes one end of the side wall of a conventional coozie. The holder includes a elongated rod having a length which substantially approximates the effective height of the stack or stacks of coozies to be carried thereon. The rod carries a fastener for securing it to the hanger. In one embodiment the header is interposed between the fastener and the rod at one of its end and serves to provide a mechanical limit for the uppermost coozie carried thereon. In another embodiment a plurality of mechanical adapters are secured along the length of the rod and designed to grip the side walls of the coozies at their upper and lower most ends.

14 Claims, 4 Drawing Sheets

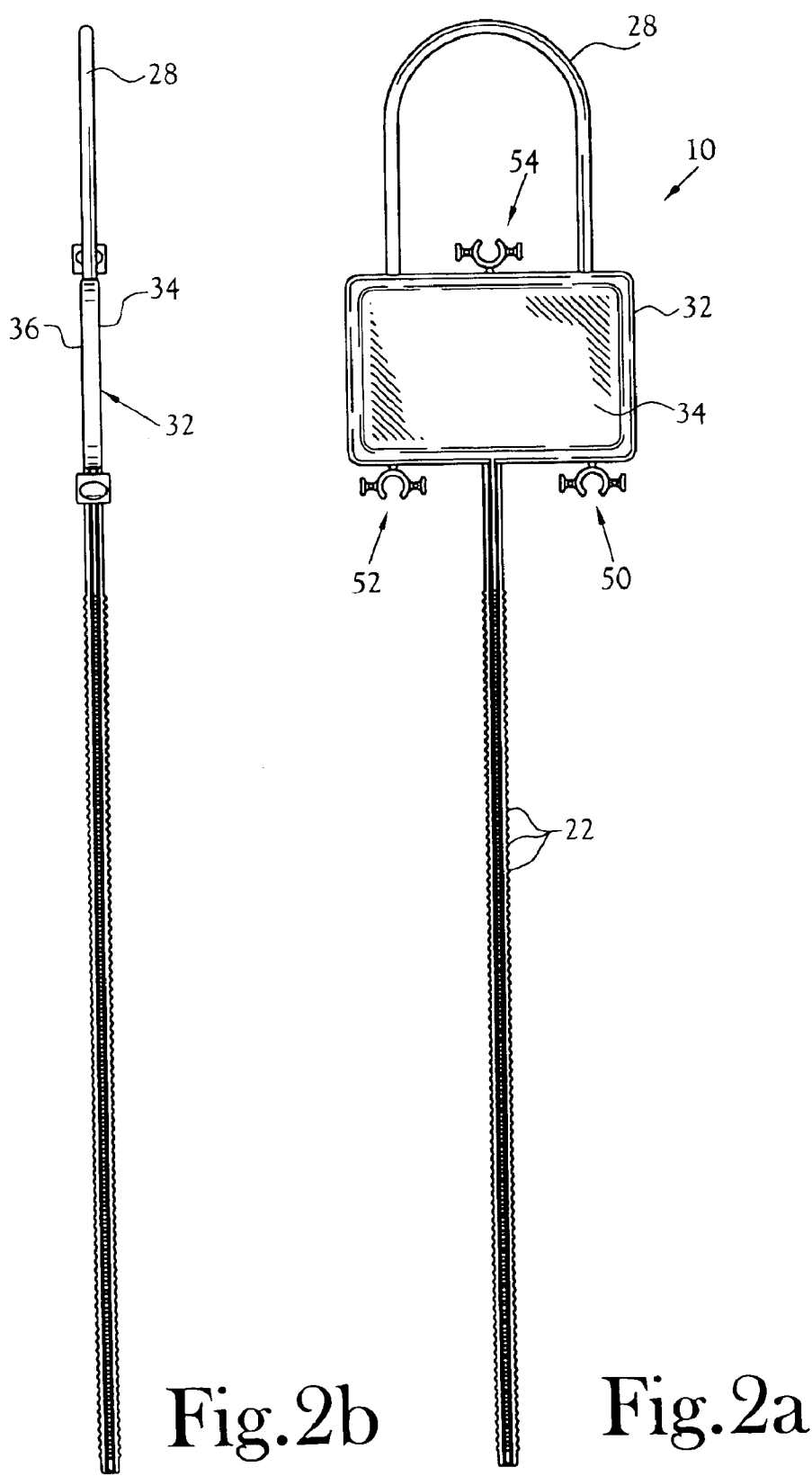

STACKED COOZIE HOLDER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention relates to a holder for coozies used to provide thermal insulation for beverage containers such as bottles and cans. More specifically, the holder is designed to support and carry stacked coozies each having a compressible bottom with a central opening therein or a hard bottom of a type that normally have an offset opening.

2. Description of the Related Art

It has long been known that coozies provide thermal insulation for beverage containers such as cups, cans and bottles. Normally, the side wall of a coozie is insulated and compressible such that a beverage container can be forced into the coozie forming a close fit, but prevents the coozie from readily separating from the container.

While coozies have long been standard equipment for sports outings, tailgate parties, boating, or the like, these items are difficult to organize and handle. For example, unused coozies tend to get lost or roll around in the floor of an automobile or boat. Moreover, they are awkward to carry and store in an organized fashion.

The present invention is designed to provide a holder for carrying and storing a plurality of stacked coozies. Moreover, the present holder is designed to be useful for carrying and storing conventional coozies which can embody a soft bottom having a central opening or a hard bottom normally having an offset opening.

BRIEF SUMMARY OF THE INVENTION

To this end, a coozie holder is provided which includes an elongated rod having a selected length which in one embodiment approximates the effective height of the stack or stacks of coozies to be carried thereon. This rod is dimensioned for being received within the central opening of a soft bottomed coozie to form a forced fit therewith. A fastener is mechanically connected to the rod for suspending the holder from a hanger such as a clothes hanger of an automobile, sport utility vehicle, or the like. Adapters are provided for being secured along the length of the rod to mount stacked coozies having hard bottoms thereon.

BRIEF DESCRIPTION OF THE SEVERAL VIEWS OF THE DRAWINGS

The above-mentioned features of the invention will become more clearly understood from the following detailed description of the invention read together with the drawings in which:

FIG. 2a illustrates a coozie holder constructed in accordance with various features of the present invention which is fabricated such that a plurality of adapters are carried by the header. These adapters can be broken away and secured on the coozie rod for supporting a plurality of stacked coozies of the hard-bottomed type.

FIG. 2b illustrates a side elevation view of the stacked coozie holder shown in FIG. 2a.

FIG. 4 illustrates a perspective view of a single adapter of the type shown in FIG. 3b, after it has been broken away from the header shown in FIG. 2a.

DETAILED DESCRIPTION OF THE INVENTION

Figure 3B:
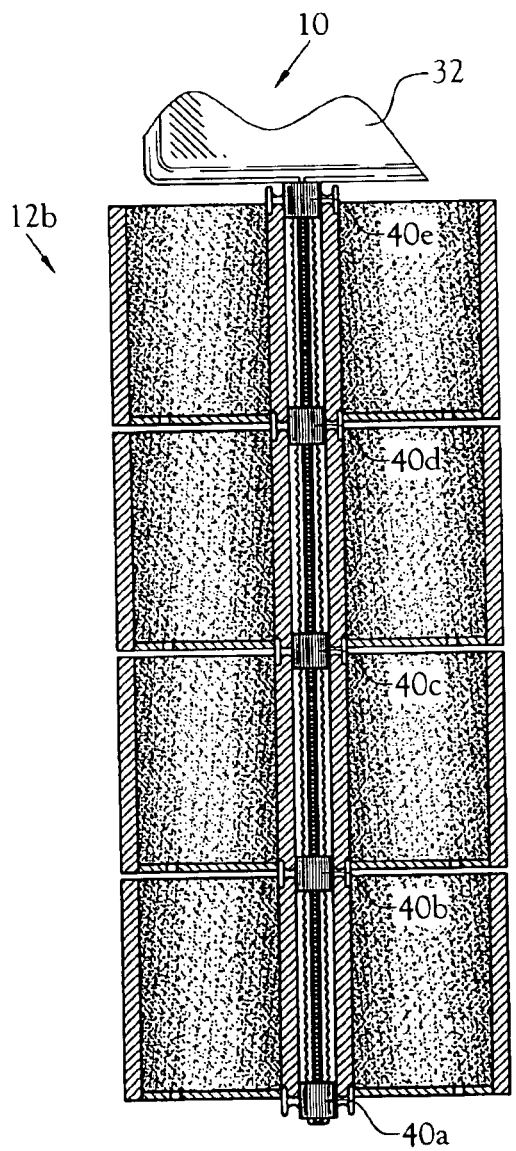
FIG. 3b illustrates a duel stack of hard-bottomed coozies carried in a side-by-side relationship on the coozie holder with the assistance of the adapters mounted at spaced locations along the length of the coozie rod.
Figure 3A:
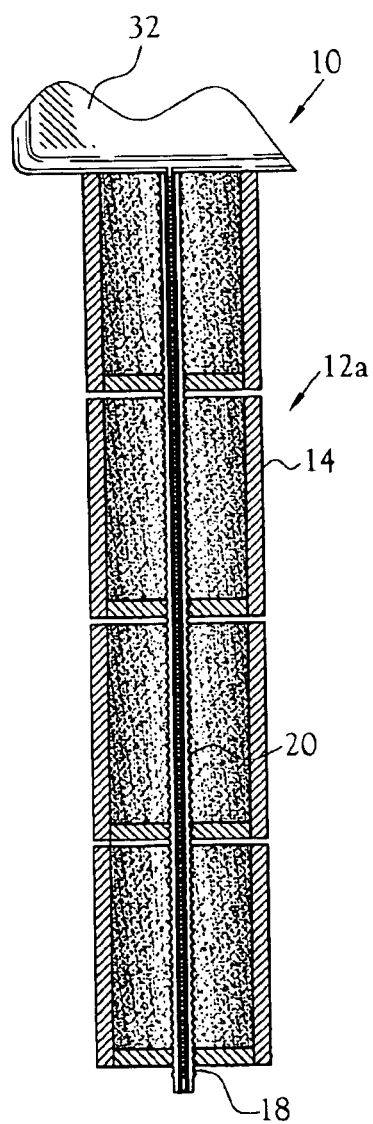
FIG. 3a illustrates a plurality of stacked coozies of the soft-bottomed type carried by the coozie rod.

Referring now to the figures, a holder 10 is provided to facilitate organizing, carrying and storing a plurality of stacked coozies 12a and 12b shown in FIGS. 3a and 3b respectively. Each of the coozies 12a is of conventional design and has an insulated side wall 14 which in the illustrated embodiment is cylindrical. This side wall is normally compressible and is closed at one end by a soft and compressible bottom having a central opening 18.

This opening allows the escape of gas as a drink container is inserted into the open end of the coozie. The coozie holder 10 is provided with an elongated rod 20 having a plurality of ridges 22 shown in FIG. 2a. This rod 20 has a length which approximates the height of the coozie stack or stacks to be carried thereon as is shown in FIG. 3a and FIG. 3b. In the embodiment shown in FIG. 1, the rod 20 is connected at its end 26 to a fastener 28. This fastener forms a hook in the illustrated embodiment and serves to assist in carrying the coozie holder and mount the holder on a suitable hanger 30 such as a hanger over the rear window of an automobile, sport utility vehicle, or the like.

Figure 1:
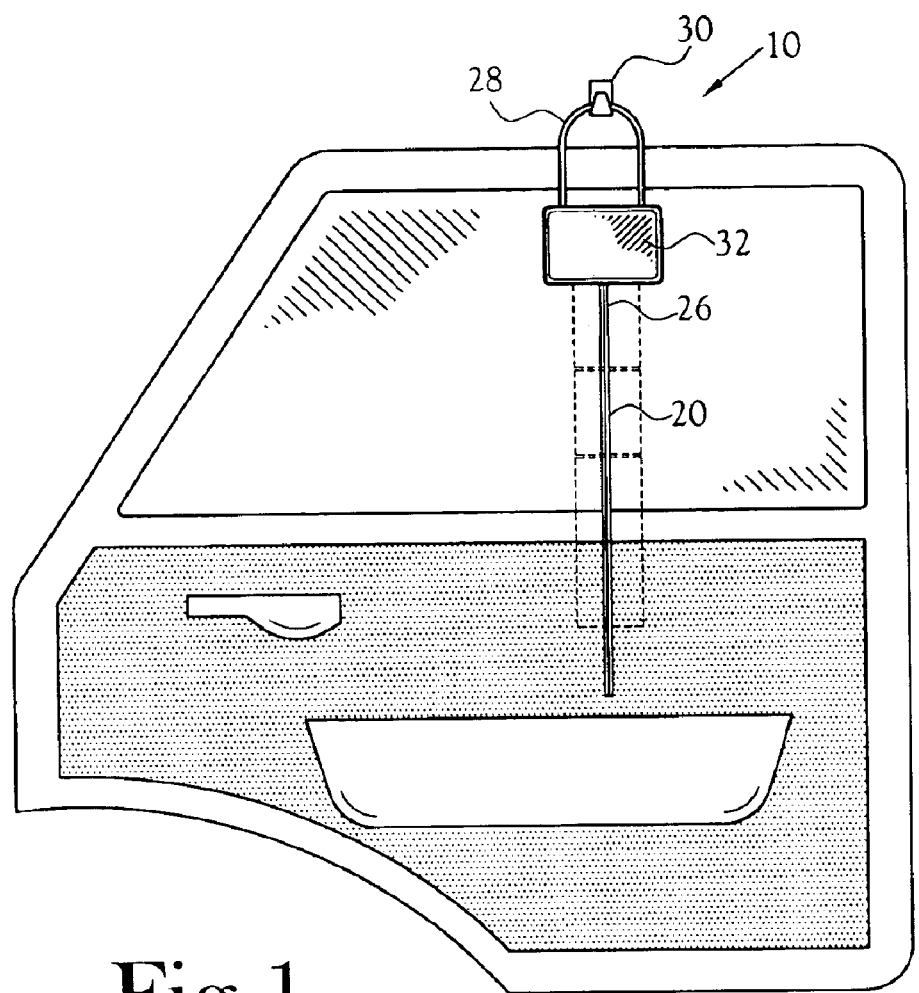
FIG. 1 illustrates a stacked coozie holder of the present design suspended from the hanger above the rear window of an automobile, sport utility vehicle, or the like. This holder is supporting a plurality of stacked soft-bottomed coozies which are shown in phantom line.
Figure 2C:
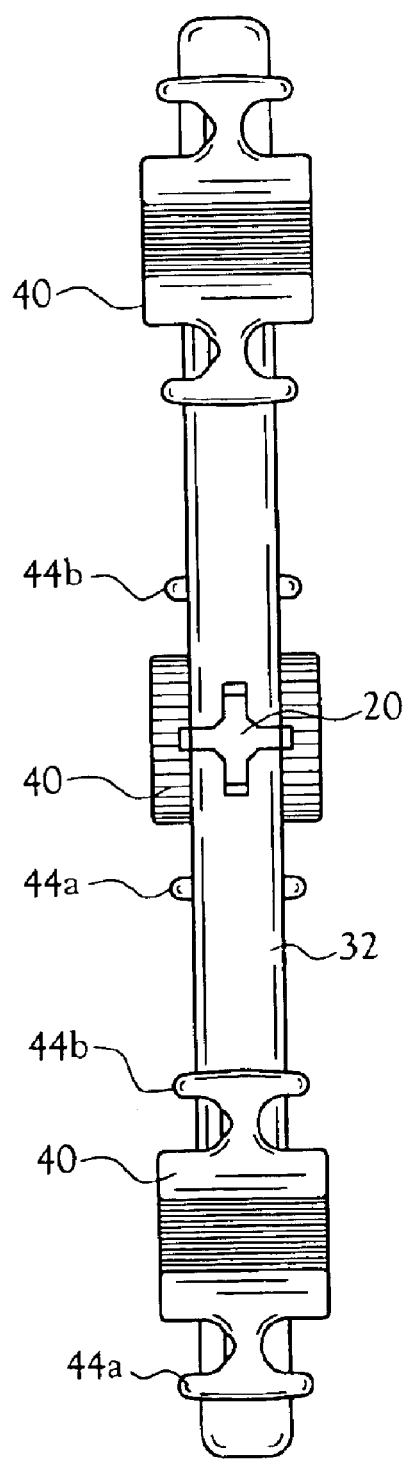
FIG. 2c illustrates a bottom view of the coozie holder shown in FIG. 2a with the adapters still carried by the coozie header.

In the embodiment shown in FIG. 1 the rod 20 is connected at its end portion 26 to the fastener 28 through the header 32. This header at its lower edge as shown in FIG. 3a and in FIG. 1 provides a limit for the uppermost coozie carried on the rod. Moreover, the header can provide a base for securing the logo of one's favorite sport team, business, or the like. For this reason, the header 32 is preferably provided with surfaces 34 and 36 as shown in FIG. 2b to which a suitable decal or other indicia can be secured as with an adhesive. As seen in the embodiment depicted in FIG. 3a the rod having the ridges 22 is threaded through the central openings 18 of each of the coozies 12a. In this manner, a stack of coozies can be mounted along the length of the rod with the compressible bottoms of each of the coozies proximate the central openings 18 forming a forced fit between the coozie bottom and the rod such that the coozies stay at a selected location along the length of the rod after being pushed to a desired location and released.

Figure 4:
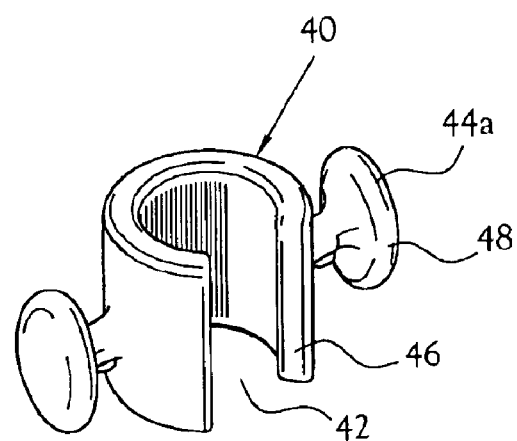

As shown in FIG. 3b, coozies having a hard bottom can also be carried in a stacked relationship on the coozie holder 10. To this end, a plurality of adapters 40a–e are provided. Details of the construction of each of these adapters are shown in FIG. 4 at 40. Each of the adapters 40 define a central opening 42 which is dimensioned for receiving the rod therethrough in a forced fit mechanical connection. This allows the adapters to be slid to a desired location along the length of the rod and spaced from each other by a distance which approximates the height of one coozie as is shown in FIG. 3b. Each of the adapters carries at least one ear 44a, and preferably a pair of ears 44a and 44b, which extends outwardly from the wall 46 of the adapter and includes at its outboard end portion a section of increased cross-sectional outline as shown at 48.

Hard bottomed coozies are mounted on the holder 10 as shown in FIG. 3b by sliding the adapters to the desired locations and using the ears 44a and 44b of the adapters 40a–e coozie to grip the upper edge and lower edge of the side walls. This gripping of the upper and lower edges of the cylindrical side walls of the coozies is shown in FIG. 3b and the coozies are stacked in a side-by-side relationship. The enlarged cross-sectional portion of the ear 44 is designed for being received between the perimeter of the bottom and the inner surface of the side wall of the hard-bottomed coozie at its lower end. Adjacent coozies are stacked such that the lower portion of the ear engages the upper portion of the adjacently stacked coozie and the upper portion of the ear engages the lower portion of the adjacently stacked coozie as shown in FIG. 3b. The coozie stacks are carried in a cantilevered manner relative to the rod 20 by the adapters and can be mounted on opposite sides of the rod thus increasing the number of hard bottomed coozies that can be carried by the holder 10.

From the forgoing detailed description, a coozie holder of the type disclosed is useful in organizing and carrying coozies in a stacked relationship. Preferably a header is provided between the rod and fastener for supporting a graphical design or logo indicating a particular sport or business affiliation of its owner or user. As shown in FIG. 2a, the adapters at locations 50, 52 and 54 can be molded onto the coozie holder at the location of the header and broken away from the holder for being mounted on the rod if the owner wishes to carry a plurality of hard bottomed coozies as is shown in FIG. 3a. Thus, the coozie holder of the present design is suitable for carrying two of the principle types of coozies normally sold. The rod length can be chosen to accommodate a coozie stack having a selected number of coozies therein.

From the foregoing description, it will be recognized by those skilled in the art that the scope of the present invention could be altered in certain particulars without deviating from the claims or the equivalence thereof. Accordingly, claims and their equivalence should be looked in defining the scope of the protection afforded.

What is claimed is:

1. A holder for a plurality of stacked coozies each having an insulated side wall and a compressible bottom closing one end of the side wall, the bottom defines a central opening to allow the escape of gas as a drink container is inserted into the open end of the coozie, the holder suitable for being supported on a hanger such as the clothes hanger above the rear window of an automobile, sport utility vehicle, or the like, the coozie holder comprising:

an elongated rod dimensioned for being received within a coozie side wall for insertion through the central opening in the bottom of said coozie and for forming a forced fit therewith, the bottom surrounding said opening being compressible to allow said coozie to be pushed alone the length of the rod and further forming a forced fit with said rod when said coozie is pushed to a desired location and released;

a fastener mechanically connected to one end portion of said rod for suspending said holder from a hanger; and a header interposed between said fastener and said rod, said header being mechanically connected to said rod at one end portion thereof and further carrying said fastener.

2. The coozie holder of claim 1 wherein said rod is provided with a plurality of ridges suitable for enhancing the forced fit formed between the opening in the bottom of the coozie and said rod such that said rod can be threaded through the bottom openings in a plurality of coozies such that said coozies are held in a stacked relationship on said rod for transport and/or storage.

3. The coozie holder of claim 1 wherein said header serves as a limit for coozies threaded onto said rod.

4. A holder for a plurality of coozies each having an insulated and compressible side wall and a rigid bottom closing one end of the side wall, the perimeter of the bottom being secured to the inside surface of the side wall proximate one end thereof, said holder being suitable for being supported on a hanger such as the clothes hanger above the rear window of an automobile, sport utility vehicle, or the like, said coozie holder comprising:

an elongated rod having a length substantially approximating the maximum height of a stack of coozies to be carried thereon;

a plurality of adapters, each having an opening for receiving said rod therethrough in a forced fit such that each of said adapters can be moved along the length of said rod to a selected location at which location the forced fit engagement between the rod and the adapter will maintain the adapter at said selected location when released, each of said adapters including a pair of ears extending outwardly therefrom for supporting a coozie proximal of the rod by mechanically connecting between respective ears of adjacent adapters with a compressed end section of the coozie side wall; and a fastener mechanically connected to said rod for suspending said holder from a hanger.

5. The coozie holder of claim 4 including a header interposed between said rod and said fastener, said header being mechanically connected to said rod at one end portion thereof and further carrying said fastener.

6. The coozie holder of 5 wherein each of said adapters includes a wall circumscribing said opening which is dimensioned for receiving said rod therein, and wherein said pair of ears includes like-configured ears extending outwardly in opposed orientation from said wall of each adapter, each ear including a distal end having an enlarged cross-sectional outline such that the compressed side wall of one end of the coozie is received within said ear and the compressed side wall of the opposite end of said coozie is received within an ear on an adjacent adapter whereby a pair of coozie stacks can be carried in a side-by-side relationship with each coozie of said pair of coozie stacks being received between respective ears extending from adjacent aligned adapters on said rod.

7. A holder for a plurality of stacked coozies each having an insulated side wall and a bottom closing one end of the side wall, the bottom defines an opening to allow the escape of gas as a drink container is inserted into the open end of the coozie, the holder suitable for being supported on a hanger such as the clothes hanger above the rear window of an automobile, sport utility vehicle, or the like, the coozie holder comprising:

an elongated rod dimensioned for being received within an opening in the bottom of a coozie and for forming a forced fit therewith, said coozie is pushed along the length of said rod to a desired location whereby said forced fit maintains said coozie at said desired location;

a fastener mechanically connected to said rod for suspending said holder from a hanger; and a header interposed between said fastener and said rod, said header being mechanically connected to said rod at one end portion thereof and further carrying said fastener.

8. The coozie holder of claim 7 wherein said rod is provided with a plurality of ridges suitable for enhancing the forced fit formed between the opening in the bottom of the coozie and said rod.

9. The coozie of claim 7 wherein said header servers as a limit for coozies threaded onto said rod.

10. The holder of claim 7 including a plurality of adapters, each having an opening for receiving said rod there through in a forced fit such that each of said adapters can be moved in spaced apart orientation along the length of said rod to a selected location at which location the forced fit engagement between the rod and the adapter will maintain the adapter at said selected location when released, each of said adapters including a pair of like-configured ears extending outwardly therefrom and being aligned with respective ears extending from adjacent adapters for supporting each coozie of the plurality of stacked coozies between adjacent adapters on the rod by mechanically connecting respective adapter ears with a compressed end section of the coozie side wall.

11. The coozie holder of claim 10 wherein each of said adapters includes a wall circumscribing said opening which is dimensioned for receiving said rod therein, and wherein each ear of said pairs of like-configured ears includes a distal end having an enlarged cross-sectional outline such that the compressed side wall of one end of the coozie is received within said ear and the compressed side wall of the opposite end of said coozie is received within an ear on an adjacent adapter whereby a pair of coozie stacks can be carried in a side-by-side relationship between respective aligned ears of adapters received on said rod.

12. The coozie holder of claim 11 where each of said adapters is carried on said header and can be broken away for positioning on said rod at selected locations along the length thereof.

13. A holder for a plurality of stacked coozies each having an insulated side wall and a compressible bottom closing one end of the side wall, the bottom defines a central opening to allow the escape of gas as a drink container is inserted into the open end of the coozie, the holder suitable for being supported on a hanger such as the clothes hanger above the rear window of an automobile, sport utility vehicle, or the like, said coozie holder comprising:

an elongated rod dimensioned for being received within the central opening in the bottom of a coozie and for forming a forced fit therewith, the bottom surrounding said opening being compressible to allow said coozie to be pushed along the length of the rod and further forming a forced fit with said rod when said coozie is pushed to a desired location and released;

a fastener mechanically connected to one end portion of said rod for suspending said holder from a hanger; and a header interposed between said fastener and said rod, said header being mechanically connected to said rod at one end portion thereof and further carrying said fastener;

whereby said header serves as a limit for coozies threaded onto said rod.

14. The coozie holder of claim 13 wherein said rod is provided with a plurality of ridges suitable for enhancing the forced fit formed between the opening in the bottom of said coozie and said rod, such that said rod can be threaded through the bottom openings in a plurality of coozies, such that said plurality of coozies are held in a stacked relationship on said rod for transport and/or storage.

* * * * *